(12) United States Patent
Lee

(10) Patent No.: US 7,154,570 B2
(45) Date of Patent: Dec. 26, 2006

(54) BACK LIGHT ASSEMBLY, LIQUID CRYSTAL DISPLAY APPARATUS AND MANUFACTURING METHOD THEREOF

(75) Inventor: Hea-chun Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 163 days.

(21) Appl. No.: 10/673,068

(22) Filed: Sep. 26, 2003

(65) Prior Publication Data
US 2004/0135936 A1    Jul. 15, 2004

(30) Foreign Application Priority Data
Sep. 28, 2002  (KR) ............... 10-2002-0059207
May 30, 2003   (KR) ............... 10-2003-0034921

(51) Int. Cl.
*G02F 1/1333* (2006.01)
*G02F 1/1335* (2006.01)
(52) U.S. Cl. ................................ 349/58; 349/64
(58) Field of Classification Search ............... 349/58, 349/60–66
See application file for complete search history.

(56) References Cited

U.S. PATENT DOCUMENTS 5,046,826 A * 9/1991 Iwamoto et al. ............ 349/65
5,956,107 A * 9/1999 Hashimoto et al. ......... 349/64

FOREIGN PATENT DOCUMENTS

| JP | 64-38621   | 3/1989  |
|----|------------|---------|
| JP | 2-85421    | 7/1990  |
| JP | 11-142845  | 5/1999  |
| JP | 11-212479  | 8/1999  |
| JP | 11-353915  | 12/1999 |
| JP | 2001-281459| 10/2001 |
| JP | 2002-236218| 8/2002  |

OTHER PUBLICATIONS

Office Action for Chinese Patent Application No. 01364999.8 w/English Text of Office Action; Mailing date of: Sep. 23, 2005; PKRH1718; 8 pgs.
English Translation of TIPO Office Action issued Jan. 9, 2006; 3 pgs.

* cited by examiner

*Primary Examiner*—Dung T. Nguyen
(74) *Attorney, Agent, or Firm*—Cantor Colburn LLP

(57) ABSTRACT

A iquid crystal display apparatus that comprises: a liquid crystal display panel that displays a picture; a plurality of light guide plates that are installed on a rear of the liquid crystal display panel and are spaced from each other; and a back light assembly with a lamp assembly that emits light toward each light guide plate. As described above, the present invention provides the back light assembly and the liquid crystal display apparatus improving the brightness, reducing the thickness, removing the bright lines and the waterfall on the liquid crystal display panel, and lowering the manufacturing cost.

18 Claims, 13 Drawing Sheets ately, the liquid crystal applied with an electric signal displays a picture using the light emitted from the back light assembly 120.

BACK LIGHT ASSEMBLY, LIQUID CRYSTAL DISPLAY APPARATUS AND MANUFACTURING METHOD THEREOF

CROSS-REFERENCE TO RELATED APPLICATIONS

This application claims the benefit of Korean Patent Applications No. 2003-0034921, filed May 30, 2003, and No. 2002-0059207, filed Sep. 28, 2002, in the Korean Intellectual Property Office, the disclosure of which are incorporated herein by reference.

BACKGROUND OF THE INVENTION

1. Field of the Invention

The present invention relates to a liquid crystal display apparatus, further particularly to a liquid crystal display apparatus having advantages that it provides high brightness, a reduced thickness, while removing bright lines and waterfall and lowering a manufacturing cost.

2. Description of the Related Art

A liquid crystal display is a display device using a liquid crystal cell for modification of light, or a device turning variation of optical property such as birefringence, circumpolarization, dichroism, and light scattering caused by rearrangement of liquid crystal particles into visual variation by applying voltage to the liquid crystal particles having a particular arrangement.

The liquid crystal display apparatus requires an additional light source or a back light assembly to emit light onto a liquid crystal display panel because the liquid crystal display apparatus is a light receptive display apparatus displaying by adjusting an amount of the light received from outside. Herein, the liquid crystal display apparatus is divided into an edge-type liquid crystal display apparatus and a direct-down type liquid crystal display apparatus according to a structure of the back light assembly.

First of all, the edge-type back light assembly of the liquid crystal display apparatus comprises a lamp installed on sides of a light guide plate guiding the light, and is usually used in a small-size liquid crystal display apparatus such as a monitor for a laptop computer or a desktop computer because it does not have as good brightness in a big-size LCD as the direct-down type back light assembly has, even though it has advantage that it has a good homogeneity of the light, long durability, and good adaptability to flattening of the liquid crystal display apparatus.

Meanwhile, the direct-down type back light assembly is mainly used for the liquid crystal display apparatus having a big screen requiring a high brightness because of higher utilization efficiency of the light compared to the edge-type back light assembly.

Hereinbelow, a conventional direct-down type liquid crystal display apparatus will be described. Also, a rear will refer to a direction toward a reflector, while a front will refer to a direction toward a liquid crystal display panel unless described otherwise.

As illustrated in FIG. 1, a conventional direct-down type liquid crystal display apparatus 100 comprises a liquid crystal display panel 110 displaying a picture, a back light assembly 120 provided on the rear of the liquid crystal display panel and emitting the light onto the liquid crystal display panel 110, a PCB (printed circuit board) 140 transferring a visual signal to the liquid crystal display panel 110, and a front chassis 160 covering front edges of the liquid crystal display panel 110.

The liquid crystal display panel 110 comprises a first panel 114 formed with a switching component like a TFT (thin film transistor) and with a pixel electrode, a second panel 112, and a liquid crystal (not shown) inserted between the first panel 114 and the second panel 112. Herein, a visual signal applied by the PCB 140 is transferred to a thin film transistor on the first panel 114 via a drive IC (not shown). Accordingly, the liquid crystal applied with an electric signal displays a picture using the light emitted from the back light assembly 120.

The back light assembly 120 comprises a lamp 121 emitting the light, a reflector 122 installed on the rear of the lamp 121, an optical sheet layer 123 having a diffusion plate 123a and a prism sheet 123b provided above the lamp 121 and being spaced from the reflector 122, and a supporting frame 124 accommodating and supporting the reflector 122 and the optical sheet layer 123.

The reflector 122 is installed on the rear of the optical sheet layer 123 and spaced from the optical sheet layer 123. Further the plurality of lamps 121 are installed on the front side of the reflector 122. The reflector 122 can minimize loss of the light by reflecting part of the light emitted from the lamp 121 to the rear toward the optical sheet layer 123.

The supporting frame 124 comprises a front frame 126 covering the front edges of the optical sheet layer 123, and a rear supporting frame 125 combined on the rear of the front frame 126 and accommodating and supporting the optical sheet layer 123 and the reflector 122 in an accommodating space formed between the front frame 126 and the rear frame 125.

Meanwhile, the liquid display panel 110 is installed on the front of the supporting frame 124 to closely support rear edges of the liquid display panel 110. Also, an inverter (not shown) inverting a direct current supplied from the outside into an alternating current to supply the alternating current to the lamp 121 is provided on the rear of the reflector 122.

The PCB 140 is connected to the first panel 114 with a FPC (flexible printed circuit) 150. The FPC 150 connected to the first panel 114 is folded twice at each corner on inside of the supporting frame 124 to install the PCB 140 connected to the other end of the FPC 150 on the rear of the rear frame 125.

Meanwhile, the conventional direct-down type liquid crystal display apparatus 100 has following disadvantages.

Firstly, as illustrated in FIG. 2, the conventional direct-down type liquid crystal display apparatus 100 has the disadvantage that bright lines occur on an area "a" on the direct front of the lamp 121 becomes brighter than an area "b" on the front of a space positioned between the lamps 121.

Secondly, to prevent the bright lines caused by difference of the brightness of each lamp 121, a distance "Q" between the lamp 121 and the optical sheet layer 123 has to be increased, which makes the flattening of the liquid crystal display apparatus 100 hard. Also, in case that a distance "P" between the lamps 121 is decreased, it may prevent occurrence of the bright lines on the liquid crystal display panel 110, however it has disadvantages that it increases a manufacturing cost and consumes more power.

Thirdly, in the conventional direct-down type liquid crystal display apparatus 100, the lamp 121 on the rear of the optical sheet layer 123 radiates heat as well as it emits the light. The heat radiated from the lamp 121 deteriorates the liquid crystal display panel 110 and the optical sheet layer 123 and, as a result, it decreases the brightness of the liquid crystal display apparatus 100 due to the heat. FIG. 3 illustrates variation of the brightness according to passage of time during an operation of the conventional direct-down type liquid crystal display apparatus 100. Here, "A" in FIG. 3 represents the variation of the brightness of the lamp 121 according to the passage of the time, and "B" in FIG. 3 represents the variation of the brightness of liquid crystal display apparatus 100 measured when it is assembled completely. It can be inferred that decrease of the brightness by the deterioration of the LCD panel 110 or the optical sheet layer 123 is more intensified when the liquid crystal display apparatus 100 is assembled completely than decrease of the brightness of the lamp 121 itself when it is not assembled.

Fourthly, it has disadvantage that waterfall occurs on the liquid crystal display panel 110 by mutual interference on an area where a driving frequency of the lamp 121 and a driving frequency of the inverter are similar to each other when the inverter is installed on the rear of the reflector 122 which is close to the rear of the lamp 121 to operate the lamp 121. A ITO (indium tin oxide) sheet 123c is installed on the front of the diffusion plate 123a to solve the problem, however, low transmittivity of the ITO sheet 123c decreases the brightness of the liquid crystal display apparatus 100, increasing the manufacturing cost of the liquid crystal display apparatus 100.

Fifthly, in the direct-down type liquid crystal display apparatus 100, the front chassis 160 and the supporting frame 124 should be disassembled to open and replace a broken lamp among the plurality of lamps 121.

SUMMARY OF THE INVENTION

Accordingly, it is an aspect of the present invention to provide to a liquid crystal display apparatus having advantages that it provides high brightness, a reduced thickness, while removing bright lines and waterfall and lowering a manufacturing cost.

Additional aspects and advantages of the invention will be set forth in part in the description which follows and, in part, will be obvious from the description, or may be learned by practice of the invention.

The foregoing and other aspects of the present invention are achieved by providing a liquid crystal display apparatus that comprises: a liquid crystal display panel that displays a picture; a plurality of light guide plates that are installed on a rear of the liquid crystal display panel and are spaced from each other; and a back light assembly with a lamp assembly that emits light toward each light guide plate.

According to an aspect of the invention, the back light assembly further comprises: a spacing part installed between the light guide plates to install the light guide plates spaced from each other; and a mold frame covering the lamp assembly installed on the opposite ends of the light guide plates.

According to an aspect of the invention, the back light assembly further comprises a reflector provided on a rear of the lowest light guide plate installed below the other light guide plates and reflecting the light.

According to an aspect of the invention, the back light assembly further comprises an auxiliary reflector plate installed between the spacing part and each light guide plate.

According to an aspect of the invention, the spacing part comprises a blocking protrusion preventing the auxiliary reflector plate from moving toward the inside in a horizontal direction.

According to an aspect of the invention, the back light assembly further comprises an optical diffuser provided on a surface of each light guide plate facing each other light guide plate.

According to an aspect of the invention, the back light assembly further comprises an optical diffuser provided on a surface of the light guide plate facing the liquid crystal display panel or on a surface of the light guide plate opposite to the surface facing the liquid crystal display panel.

According to an aspect of the invention, the optical diffuser is a convexo-concave pattern formed on the surface of the light guide plate.

According to an aspect of the invention, the optical diffuser is a convexo-concave pattern formed on the surface of the light guide plate.

According to an aspect of the invention, the lamp assembly comprises: a lamp; and a lamp reflector preventing the light of the lamp from radiating to a direction opposite to the light guide plate.

According to an aspect of the invention, the liquid crystal display apparatus further comprises a front frame installed between the liquid crystal display panel and the highest light guide plate positioned on the top of the other light guide plates.

According to an aspect of the invention, the liquid crystal display apparatus comprises: a PCB operating the liquid crystal display panel; and a FPC connecting the liquid crystal display panel and the PCB, and folded at an edge of the back light assembly to install the PCB on one side of the circumference of the back light assembly.

According to another aspect of the present invention, the above and other aspect may be also achieved by providing a manufacturing method of a liquid crystal display apparatus that comprises: providing a mold frame that is partitioned by a spacing part and is formed with a front accommodation space and a rear accommodation space; accommodating a second light guide plate into the rear accommodation space of the mold frame; installing a reflector on a rear of the second light guide plate; accommodating a first light guide plate into the front accommodation space of the mold frame; and inserting lamp assemblies into either of the opposite spaces which are formed between the mold frame and the first light guide plate and the second light guide plate.

According to an aspect of the invention, the manufacturing method of the liquid crystal display apparatus further comprises: placing an optical sheet layer on the front of the first light guide plate; and installing a front frame to closely contact the front edges of the first light guide plate and the optical sheet layer.

According to an aspect of the invention, the manufacturing method of the liquid crystal display apparatus further comprises covering the rear accommodation of the mold frame.

According to an aspect of the invention, the lamp assembly is inserted slidingly into the space formed between the mold frame and the circumference of the first light guide plate and the second light guide plate.

According to an aspect of the invention, the lamp assembly is inserted slidingly into the space formed between the mold frame and the circumference of the first light guide plate and the second light guide plate.

According to an aspect of the invention, the lamp assembly is inserted slidingly into the space formed between the mold frame and the circumference of the first light guide plate and the second light guide plate.

According to another aspect of the present invention, the above and other aspect may be also achieved by providing a back light assembly that is installed on a rear of a liquid crystal display panel of a liquid crystal display apparatus, comprising: a plurality of light guide plates that are installed on the rear of the liquid crystal display panel and are spaced from each other; and a lamp assembly that emits light toward each light guide plate.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
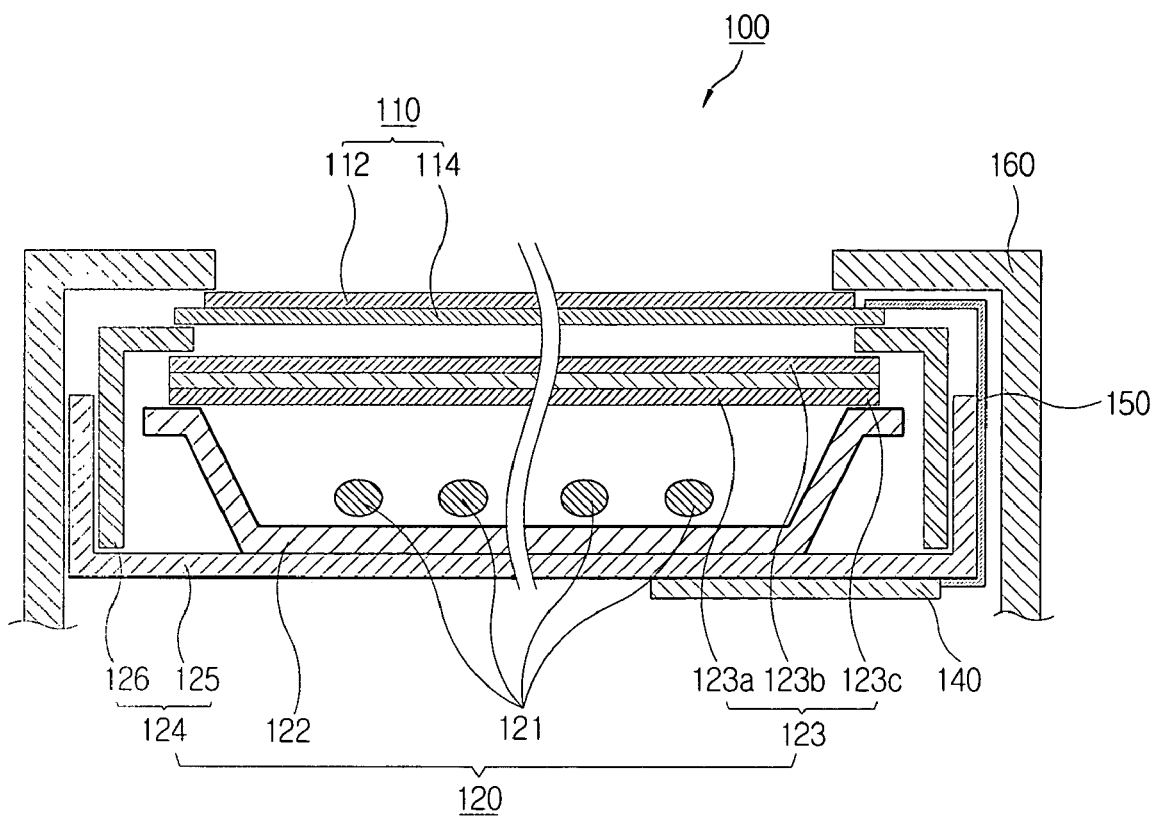
FIG. 1 is a schematic view of a conventional liquid crystal display apparatus.
Figure 2:
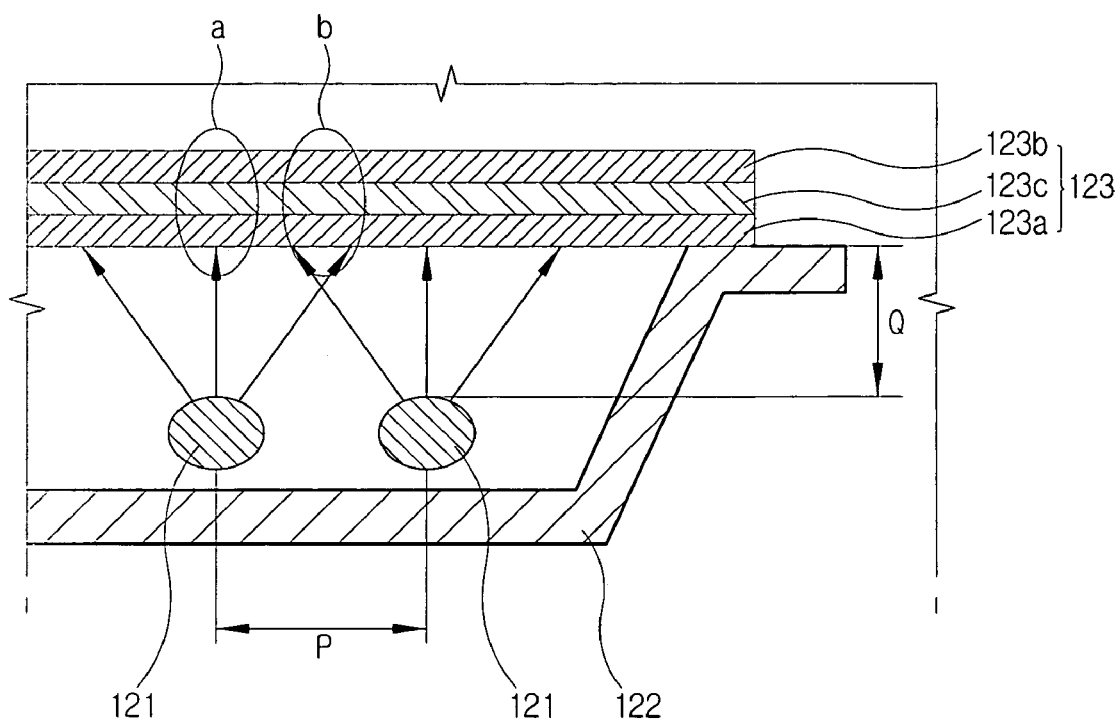
FIG. 2 illustrates distribution of light of a back light assembly in the liquid crystal display apparatus in FIG. 1.
Figure 3:
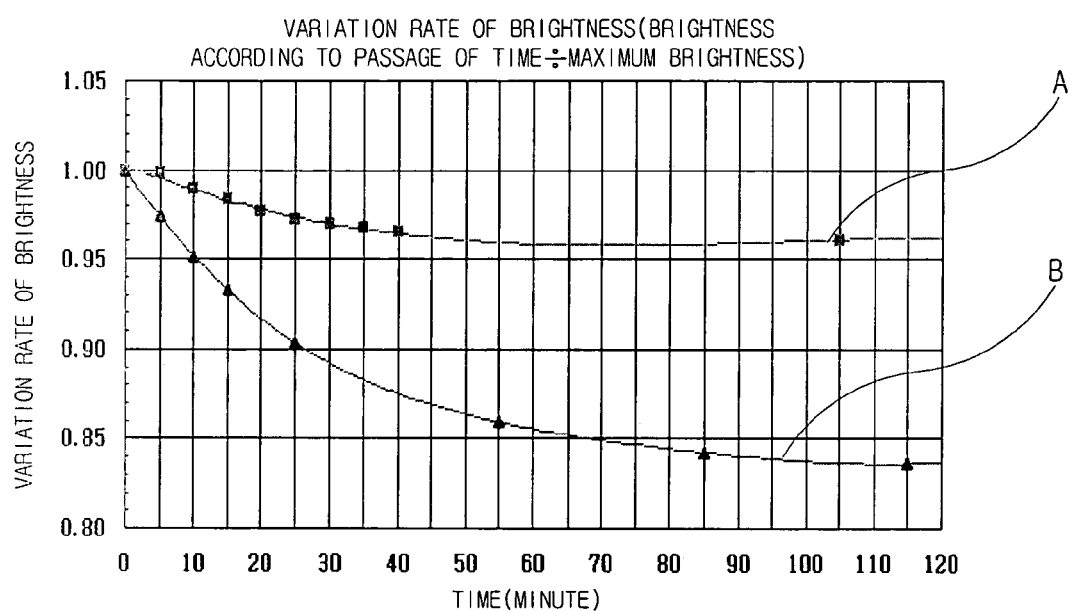
FIG. 3 is a graph illustrating variation of brightness according to passage of time during an operation of the liquid crystal display apparatus in FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
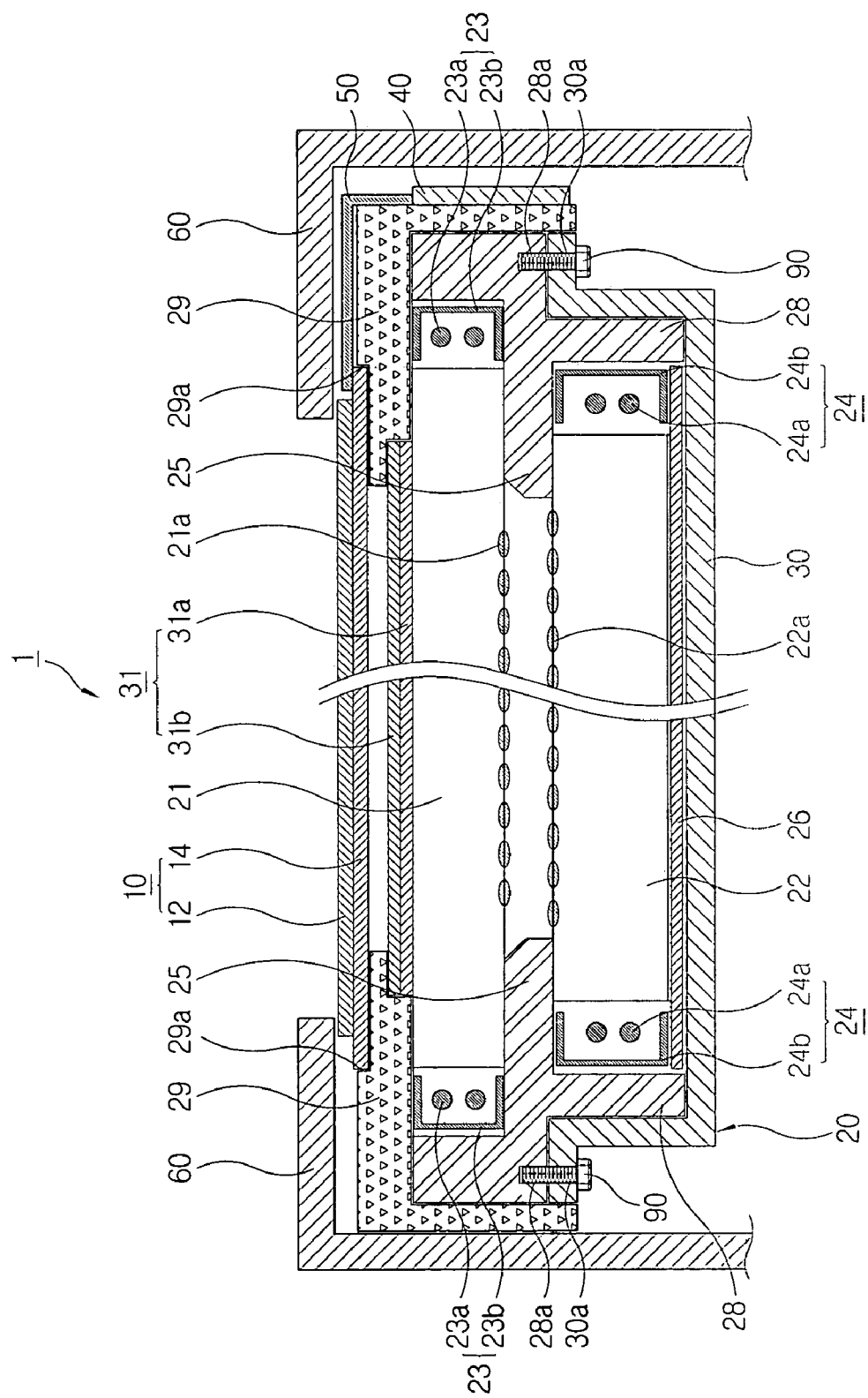
FIG. 4 is a cross-sectional view of the liquid crystal display apparatus according to a first embodiment of the present invention.

As illustrated in FIG. 4, a liquid crystal display apparatus 1 according to a first embodiment of the present invention comprises a liquid crystal display panel 10 displaying a picture, a back light assembly 20 provided on a rear of the liquid crystal display panel 10 and emitting light onto the liquid crystal display panel 10, a PCB (printed circuit board) 40 to apply a visual signal to the liquid crystal display panel 10, and a front chassis 60 covering front circumference of the liquid crystal display panel 10.

The liquid crystal display panel 10 comprises a first panel 14 formed with a switching component like a TFT (thin film transistor) and with a pixel electrode, a second panel 12, and a liquid crystal (not shown) inserted between the first panel 14 and the second panel 12. Herein, the visual signal applied by the PCB 40 is transferred to a thin film transistor on the first panel 14 via a drive IC (not shown). Accordingly, the liquid crystal applied with an electric signal displays a picture with the light emitted from the back light assembly 20.

The back light assembly 20 comprises a first light guide plate 21 and a second light guide plate 22 installed on the rear of the liquid crystal display panel 10 being spaced from each other, and a first lamp assembly 23 and a second lamp assembly 24 installed at least on one side of the opposite ends of the light guide plates 21 and 22 and emitting the light toward the respective light guide plates 21 and 22.

The first light guide plate 21 and the second light guide plate 22 is spaced from each other in parallel by a spacing part 25. The lamp assemblies 23 and 24 are supported by a mold frame 28, as it is covered and accommodated by the mold frame 28 on the opposite ends of the light guide plates 21 and 22. Herein, the spacing part 25 functions to prevent electrical interference between both lamp assemblies 23 and 24 by separating the first lamp assembly 23 and the second lamp assembly 24. Also, an inner space of the mold frame 28 is partitioned into a front accommodation space and a rear accommodation space by the spacing part 25. The embodiment of the present invention adopts the mold frame 28 integrated with the spacing part 25.

The first light guide plate 21 is accommodated in the front accommodation space of the mold frame 28 as a rear of the first light guide plate 21 is closely supported by the spacing part 25. Also, the second light guide plate 22 is accommodated in the rear accommodation space of the mold frame 28 as a front of the second light guide plate 22 is closely supported by the spacing part 25. In other words, the first light guide plate 21 and the second light guide plate 22 are spaced from each other with a predetermined distance by the spacing part 25 as they are accommodated in the front and rear accommodation spaces, respectively.

The rear of the light guide plate 21 is provided with an optical diffuser 21a. The optical diffuser 21a functions to improve brightness of the liquid crystal display apparatus 1 by spreading the light emitted from the second light guide plate 22 and the first lamp assembly 23 evenly throughout all area of the liquid crystal display panel 10 as the optical diffuser 21a diffuses the light emitted from the second light guide plate 22 and the first lamp assembly 23 toward the liquid crystal panel 10. Herein, the optical diffuser 21a may be provided as a convexo-concave pattern on the rear of the first light guide plate 21, or diffusing effect may be achieved by printing the rear of the first light guide plate 21 with light-diffusing ink or by inserting material having a light-diffusing property into the first light guide plate 21.

Additionally, the optical diffuser 22a may be provided on the front of the second light guide plate 22. The optical diffuser 22a provided on the second light guide plate 22 is preferably made of the same material and the same shape used for the optical diffuser 21a on the first light guide plate 21.

The first lamp assembly 23 and the second lamp assembly 24 is installed in spaces formed between the circumference of the first and the second light guide plates 21 and 22 and inside walls of the front and the rear accommodation spaces of the mold frame 28, respectively.

The first lamp assembly 23 and the second lamp assembly 24 comprises lamps 23a and 24a emitting the light, and lamp reflectors 23b and 24b reflecting the light emitted from the lamps 23a and 24a in the direction opposite to the first and the second light guide plates 21 and 22 toward the first light guide plate 21 and the second light guide plate 22. Such configuration of the first lamp assembly 23 and the second lamp assembly 24 as described above minimizes loss of the light caused by the light emitted in direction opposite to the first light guide plate 21 and the second light guide plate 22. Also, by providing the lamps 23a and 24a around the circumference of the first and the second light guide plates 21 and 22, the waterfall occurring on the liquid crystal display panel 10 by the mutual interference can be removed by spacing an inverter (not shown) installed on the rear of the back light assembly 20 from the lamps 23a and 24a.

A reflector plate 26 is provided on the rear of the second light guide plate 22. The reflector plate 26 is made of material having a regular reflection property such as a silver fusion film or a white film. Accordingly, the reflector plate 26 minimizes the loss of the light emitted from the lamp 24a of the second lamp assembly 24 by reflecting the light transmitted through the rear of the second light guide plate 22 toward the second light guide plate 22.

Here, a rear frame 30 is provided on the rear of the reflector plate 26 to protect the rear of the rear accommodation space of the mold frame 28 as combined with the mold frame 28. Herein, a screw hole 30a is provided on the rear frame 30, and a screw combining part 28a is provided on the mold frame 28 on a position corresponding to the screw hole 30a so that the rear frame 30 combined to the mold frame 28 by combining a screw 90 passing through the screw hole 30a with the screw combining part 28a. The embodiment of the present invention illustrates the rear frame 30 combined to the mold frame 28 with the screw 90, however, various combining means such as a hook coupling or an adhesive member may be employed as well.

The PCB 40 is connected to the first panel 14 of the liquid crystal display panel 10 with a FPC (flexible printed circuit) 50. The FPC 50 connected to the first panel 14 is folded at an edge of the back light assembly 20 to install the PCB 40 connected to the other end of the FPC 50 on one side of the circumference of the back light assembly 20.

Meanwhile, an optical sheet layer 31 may be provided on the front of the first light guide plate 21 to improve the quality of the liquid crystal display panel 10. The optical sheet layer 31 preferably comprises a diffusion panel 31a directing the light entering from the first light guide plate 21 toward the liquid crystal display panel 10 in a perpendicular direction, and a prism sheet 31b improving the brightness of the liquid crystal display apparatus 1.

The diffusion panel 31a can improve front brightness of the liquid crystal display apparatus 1 by directing the light entering in a normal line direction toward the perpendicular direction according to the refraction of the light, because the light from the first light guide plate 21 has more amount of the light in the normal line direction than amount of the light in the perpendicular direction.

The prism sheet 31b is provided on the front of the diffusion panel 31a. The prism sheet 31b improves the frontal brightness of the liquid crystal display apparatus 1 and reduces power consumption by decreasing a view angle of the light emitted from the diffusion panel 31a, because the light emitted from the diffusion panel 31a is diffused light having a broad view angle.

A front frame 29 protects the front edges of the first light guide plate 21 and the front edges of the optical sheet layer 31. FIG. 4 illustrates the front frame 29 covering up the outer wall of the mold frame 28 having the front accommodation space. However, the front frame 29 may be provided just to contact the front of the first light guide plate 21, the optical sheet layer 31, and the mold frame 28. Herein, the front frame 29 covers the front as combined with the mold frame 28 using various types of combining structures such as a screw, a hook, and an adhesive member. Also, a supporting groove 29a may be provided on a front of the front frame 29 to accommodate and support the liquid crystal display panel 10.

Figure 5:
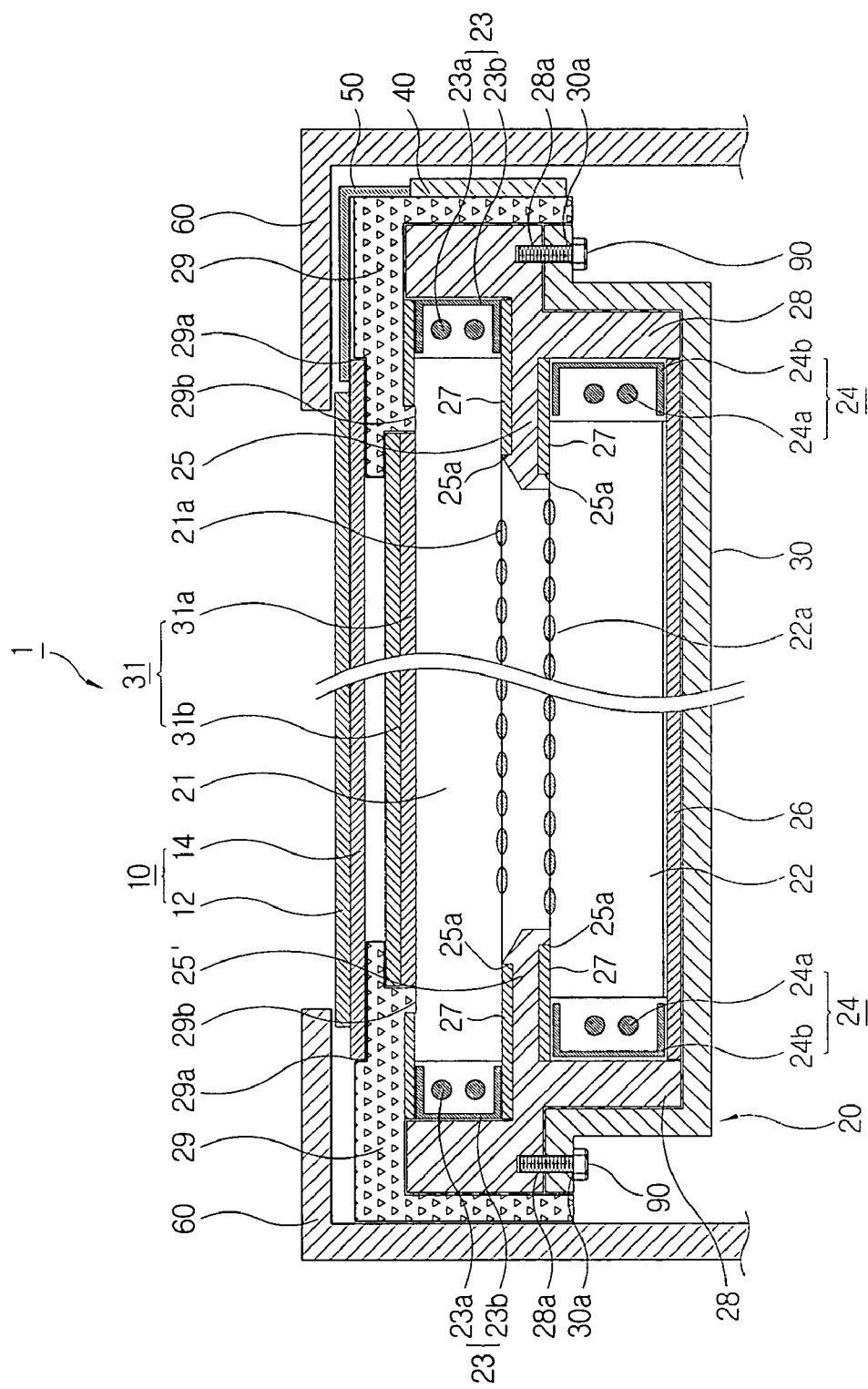
FIG. 5 is a cross-sectional view of the liquid crystal display apparatus according to a second embodiment of the present invention.

FIG. 5 is a cross-sectional view of a liquid crystal display apparatus 1' according to a second embodiment of the present invention. As illustrated, the liquid crystal display apparatus 1' according to the second embodiment of the present invention comprises auxiliary reflector plates 27 installed between the spacing part 25 and the rear of the first light guide plate 21, between the spacing part 25 and the front of the second light guide plate 22, and between the front of the first light guide plate 21 and the rear of the front frame 29. Accordingly, it reduces the loss of the light by reflecting the light emitted from the lamps 23a and 24a with a predetermined incidence angle toward the first light guide plate 21 and the second light guide plate 22.

Herein, a spacing part 25' provided with the auxiliary reflector plate 27 is preferably formed with a blocking protrusion 25a to prevent the auxiliary reflector panel 27 from moving toward the inside in a horizontal direction. Also, the rear side of the front frame 29 is preferably formed with a blocking protrusion 29b to prevent the auxiliary reflector panel 27 from moving.

Figure 6:
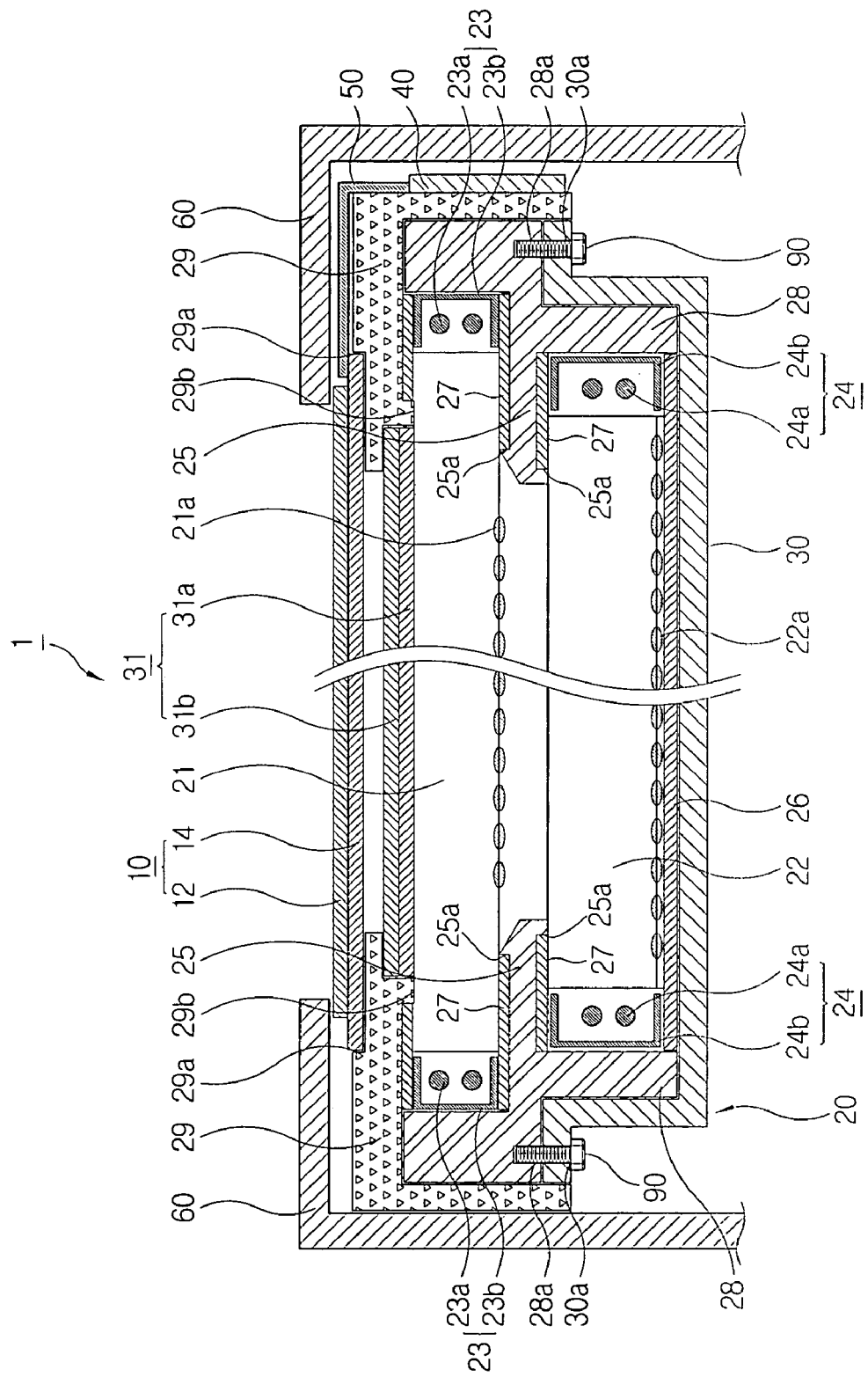
FIG. 6 is a cross-sectional view of the liquid crystal display apparatus according to a third embodiment of the present invention.

FIG. 6 is a cross-sectional view of a liquid crystal display apparatus 1" according to a third embodiment of the present invention. The liquid crystal display apparatus 1" according to the third embodiment of the present invention is provided with an optical diffusion part 22a' for a second light guide plate 22' on the rear of the second light guide plate 22'.

Hereinbelow, an assembly process of the liquid crystal display apparatus 1' according to the second embodiment of the present invention, for example, will be described in reference to FIGS. 7 through 10.

Figure 7:
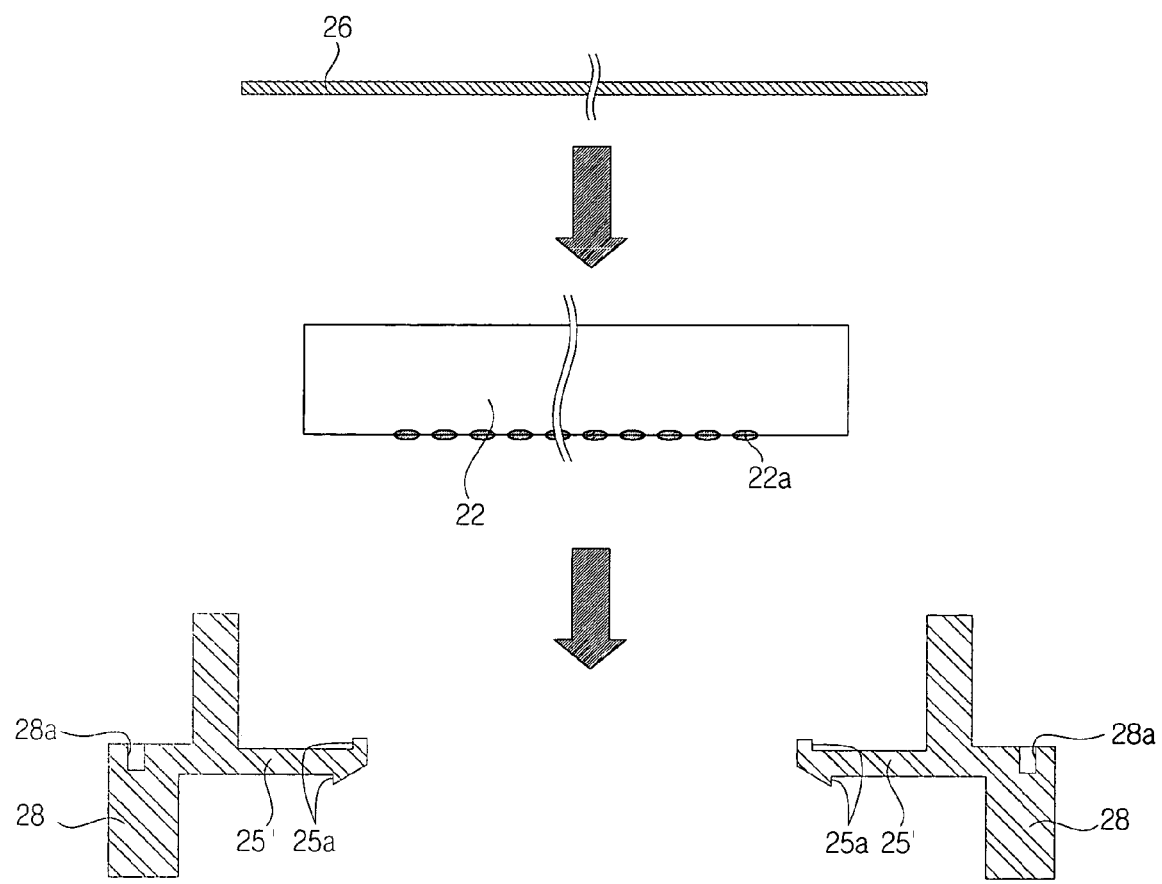
FIGS. 7 through 10 illustrate assembling the back light assembly according to the second embodiment of the present invention.
Figure 8:
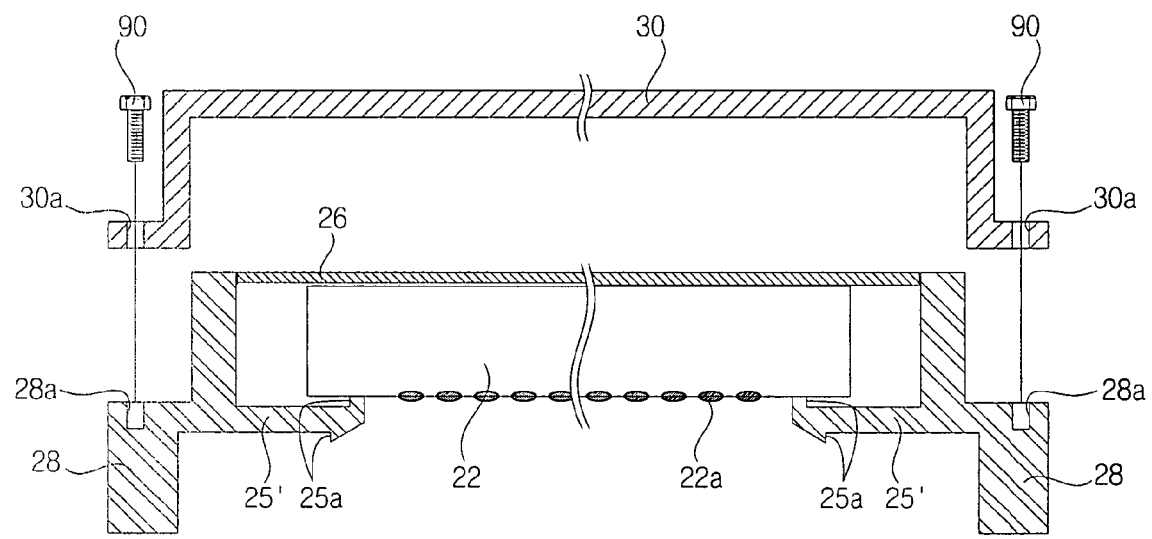

Firstly, as illustrated in FIG. 7, the mold frame 28 is provided on a predetermined working table in a way that the rear accommodation space of the mold frame 28 integrated with the spacing part 25' faces upward. The second light guide plate 22 is place on the spacing part 25' to accommodate the second light guide plate 22 in the rear accommodation space of the mold frame 28, and then the reflector panel 26 is installed on the second light guide plate 22.

Upon completing the process described above, as illustrated in FIG. 8, the rear frame 30 covers the rear accommodation space of the mold frame 28 as the second light guide plate 22 and the reflector panel 26 is accommodated in the rear accommodation space. Herein, the rear frame 30 may be combined to the mold frame 28 by the screw 90 as described above.

Figure 9:
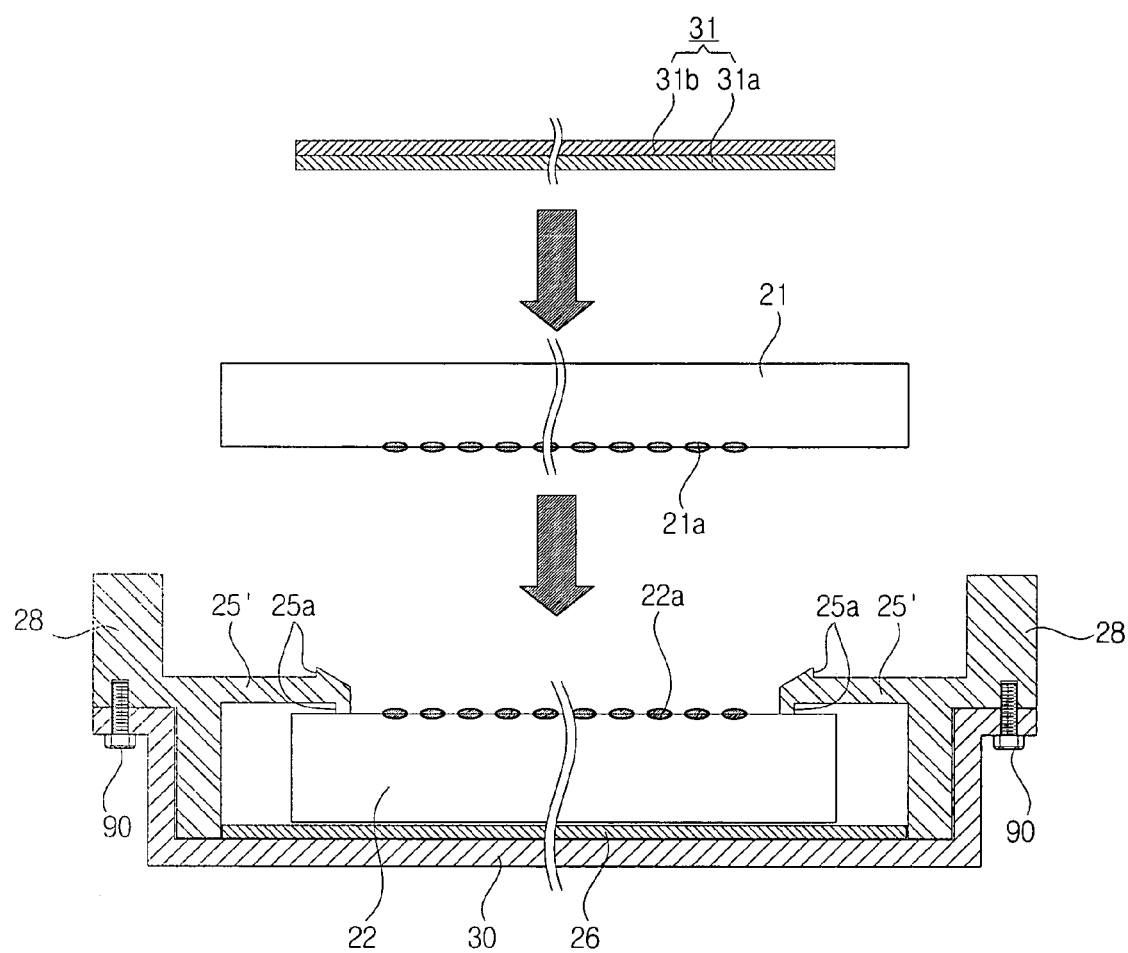
Figure 10:
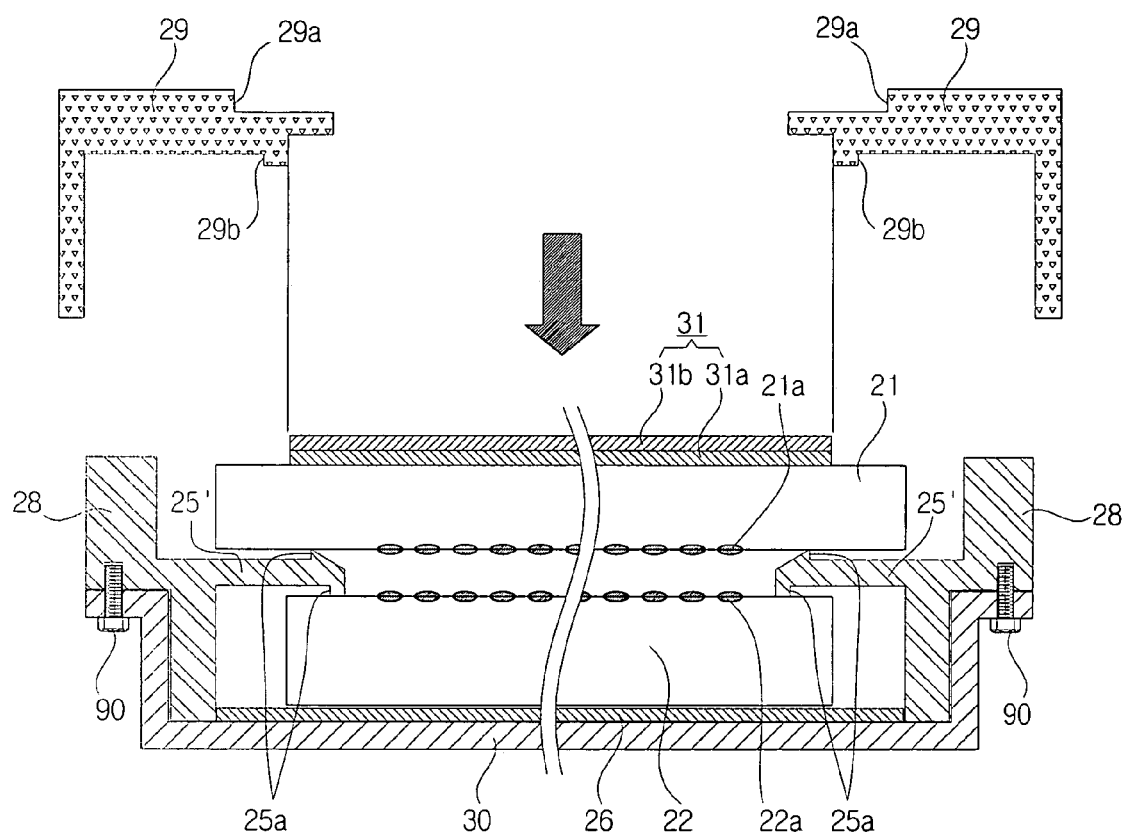

Upon completing combination of the rear frame 30, as illustrated in FIG. 9 and FIG. 10, the mold frame 28 is placed upside down so that the front accommodation space faces upward. The first light guide plate 21 is place on the spacing part 25' of the mold frame 28 to accommodate the first light guide plate 21 in the front accommodation space of the mold frame 28, and then the optical sheet layer 31 is installed on the first light guide plate 21. The front frame 29 is closely installed on the side of the circumference of the first light guide plate 21 and the optical sheet layer 31.

Upon completing installation of the front frame 29, the lamp assemblies 23 and 24 are inserted into the spaces formed between the mold frame 28 and the sides of the circumference of the first and the second light guide plates 21 and 22, completing assembly of the back light assembly 20. Herein, the lamp assemblies 23 and 24 are inserted slidingly into the space formed between the mold frame 28 and the sides of the circumference of the first and the second light guide plates 21 and 22. In this way, the lamps 23a and 24a can be replaced without disassembling the back light assembly 20 by providing the lamp assemblies 23 and 24 to be insertable slidingly into the space between the mold frame 28 and the sides of the circumference of the first and the second light guide plates 21 and 22.

Meanwhile, the auxiliary reflector panel 27 can be installed by sliding into the space between the mold frame 28 and the first and the second light guide plate 21 and 22 in the same manner described above for the lamp assemblies 23 and 24 after or before the insertion of the lamp assemblies 23 and 24. Also, it may be installed onto the spacing part 25' of the mold frame 28 when installing the first and the second light guide plates 21 and 22.

Upon completing assembly of the back light assembly 20 according to the process described above, the liquid crystal display panel 10 is inserted into the supporting groove 29a of the front frame 29, and then it is placed on the front of the back light assembly 20. Lastly, the front chassis 60 covers the front edges of the liquid crystal display panel 10.

In the embodiments described above, the liquid crystal display apparatuses 1, 1', and 1" comprise two light guide plates 21 and 22, however, they may comprise more than three light guide plates being spaced from each other.

Additionally, the first and the second lamp assemblies 23 and 24 are installed on the opposite ends of the first and the second light guide plates 21 and 22, respectively, however, the lamp assemblies may be provided on either of the opposite ends of the respective light guide plate with the rear of the light guide plate formed to be sloped.

In the embodiments described above, the liquid crystal display apparatuses 1, 1', and 1" comprise the optical sheet layer 31, however, the optical sheet layer 31 does not necessarily include both the diffusion panel 31a and the prism sheet 31b, in case that the first and the second light guide plates 21 and 22 and the optical diffuser 21a and 22a on the respective light guide plates 21 and 22 improves the quality of the brightness.

Hereinbelow, advantages of the liquid crystal display apparatuses 1, 1', and 1" according to embodiments of the present invention compared to the convention direct-down type liquid crystal display apparatuses 100 will be described.

Figure 11:
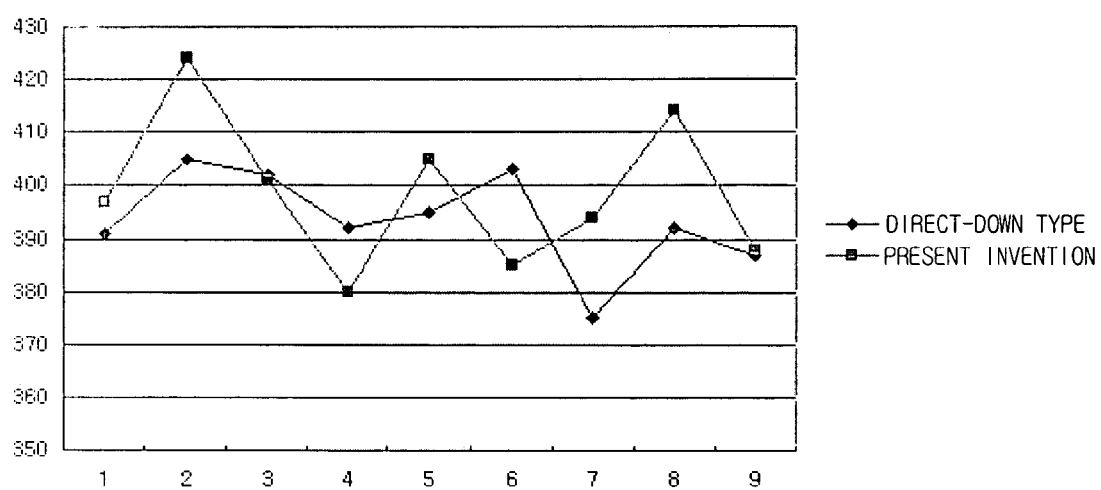
FIGS. 11 through 13 are graphs illustrating display properties of the liquid crystal display apparatus according to embodiments of the present invention.

Firstly, the liquid crystal display apparatuses 1, 1', and 1" according to the embodiments of the present invention improve the brightness as a whole compared to the convention direct-down type liquid crystal display apparatuses 100. If the light enters into the second light guide plate 22 as to proceed toward the optical diffuser 22a, the light is diffused by the optical diffuser 21a formed on a rear surface of the first light guide plate 21, and then enters the first light guide plate 21. Accordingly, as illustrated in FIG. 11, it improves the brightness as a whole compared to the conventional direct-down type liquid crystal display apparatus 100.

Figure 12:
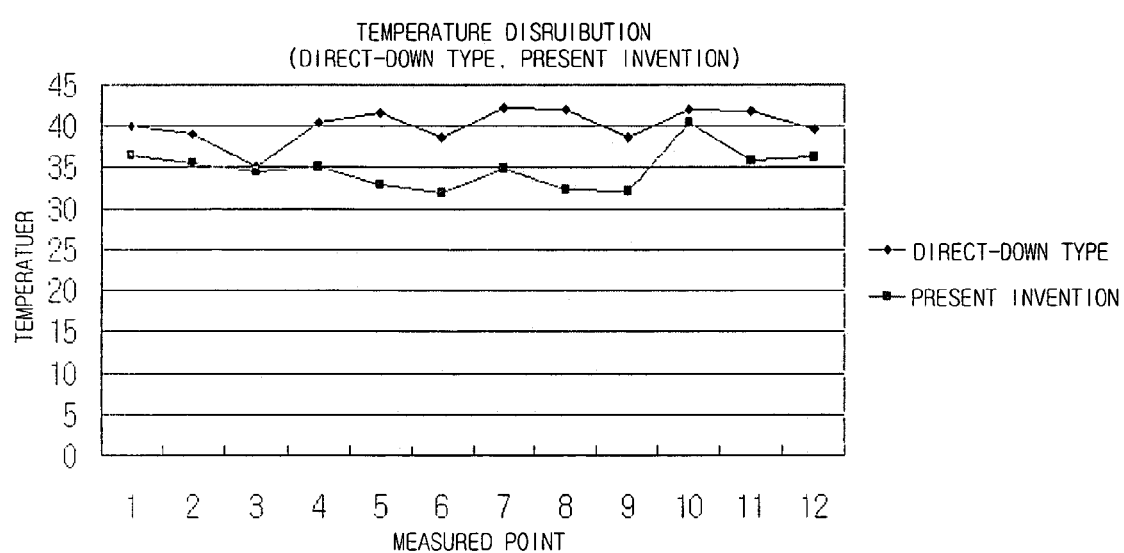
Figure 13:
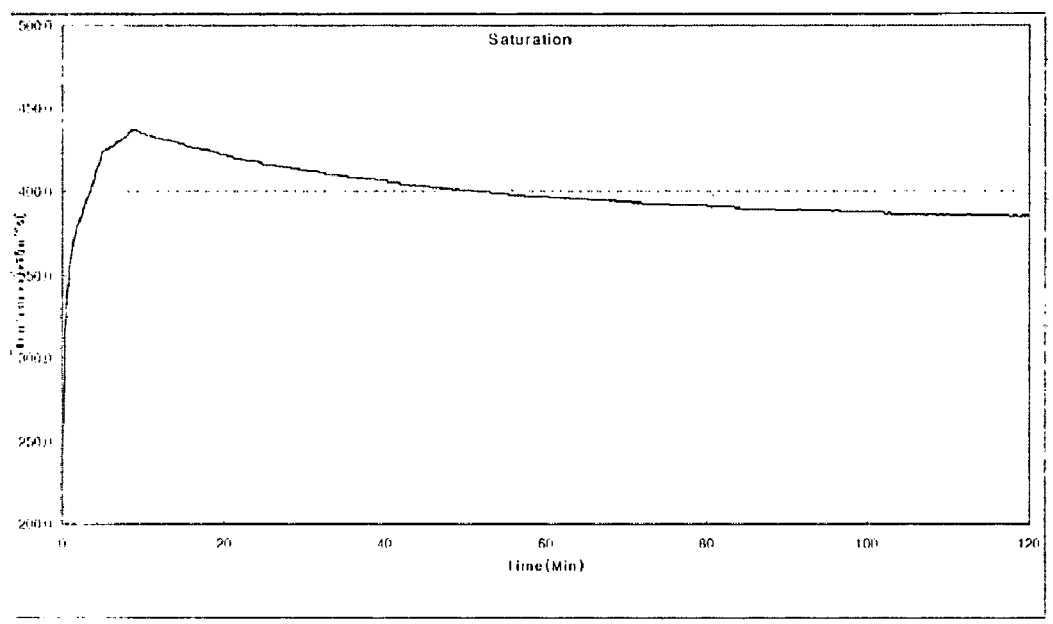

Additionally, the liquid crystal display apparatuses 1, 1', and 1" according to embodiments of the present invention is less affected by heat from the lamp 23a as the lamp 23a is installed on the opposite sides on the light guide plate. FIG. 12 illustrates temperature distribution of the liquid crystal display apparatuses 1, 1', and 1" according to embodiments of the present invention and the conventional direct-down type liquid crystal display apparatus 100, and FIG. 13 illustrates variation of the brightness according passage of time in the liquid crystal display apparatuses 1, 1', and 1" according to embodiments of the present invention. As illustrated in those drawings, the liquid crystal display apparatuses 1, 1', and 1" according to embodiments of the present invention reduces effect of the heat from the lamp 23a and prevents the heat from decreasing the brightness of the liquid crystal display apparatuses 1, 1', and 1".

Also, the liquid crystal display apparatuses 1, 1', and 1" according to embodiments of the present invention is thinner than the conventional direct-down type liquid crystal display apparatus 100. In the conventional direct-down type liquid crystal display apparatus 100, the lamps 121 and the liquid crystal display panel 110 is required to be spaced from each other to prevent the bright lines caused by the variation of the brightness between the lamps 121 as the lamps 121 are installed on the rear of the liquid crystal display panel 110. However, in the liquid crystal display apparatuses 1, 1', and 1" according to embodiments of the present invention, any additional space is not required other than the space that the first light guide plate 21 and the second light guide plate 22 take, which reduces the thickness. Additionally, the liquid crystal display apparatuses 1, 1', and 1" according to embodiments of the present invention provides the same view angle as the view angle provided by the conventional direct-down type liquid crystal display apparatus 100 as well as it reduces the thickness.

Also, the liquid crystal display apparatuses 1, 1', and 1" according to embodiments of the present invention reduces manufacturing cost visibly compared to the conventional direct-down type liquid crystal display apparatus 100 as well as it improves the quality of the product. The conventional direct-down type liquid crystal display apparatus 100 used the ITO sheet having high price to remove the waterfall, however, it appears that the liquid crystal display apparatuses 1, 1', and 1" according to embodiments of the present invention does not require additional diffusion sheet other than the optical diffuser 21a provided on the first and the second light guide plate 21 and 22. Accordingly, it reduces the manufacturing cost visibly.

As described above, the present invention provides the back light assembly and the liquid crystal display apparatus improving the brightness, reducing the thickness, removing the bright lines and the waterfall on the liquid crystal display panel, and lowering the manufacturing cost.

Altlhough a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display apparatus comprising:
a liquid crystal display panel that displays a picture;
a back light assembly that emits light to the liquid crystal display panel, the back light assembly including:
first and second light guide plates spaced from each other;
a first lamp assembly disposed adjacent to the first light guide plate;
a second lamp assembly disposed adjacent to the second light guide plate; a mold frame to support the back light assembly, the mold frame including:
a first accommodation space to receive the first light guide plate and the
first lamp assembly;
a second accommodation space to receive the second light guide end the
second lamp assembly; and
a spacing part disposed between the first and second lamp assemblies, wherein the spacing part includes an upper surface making contact with the first lamp assembly, and a lower surface making contact with the second lamp assembly.

2. The liquid crystal display apparatus according to claim 1, wherein the spacing part is further disposed between an end portion of the first light guide plate and an end portion of the second light guide plate.

3. The liquid crystal display apparatus according to claim 2, wherein the spacing part comprises a blocking protrusion preventing the auxiliary reflector plate from moving toward the inside in a horizontal direction.

4. The liquid crystal display apparatus according to claim 1, wherein the back light assembly further comprises a reflector provided on a rear of the second light guide plate and reflecting the light.

5. The liquid crystal display apparatus according to claim 1, wherein the back light assembly further comprises first and second optical diffusers provided on a lower surface of the first light guide plate and an upper surface of the second light guide plate, respectively.

6. The liquid crystal display apparatus according to claim 5, wherein each of the first and second optical diffusers has a convexo-concave pattern.

7. The liquid crystal display apparatus according to claim 1, wherein the back light assembly further comprises an optical diffuser provided on a surface of the first light guide plate or on a surface of the second light guide plate.

8. The liquid crystal display apparatus according to claim 7, wherein the optical diffuser has a convexo-concave pattern.

9. The liquid crystal display apparatus according to claim 1, wherein each of the first and second lamp assemblies comprises:
   a lamp disposed in a circumference of the first or second light guide plate; and
   a lamp reflector to surround the lamp and prevent the light of the lamp from radiating to a direction opposite to the first or second light guide plate.

10. The liquid crystal display apparatus according to claim 9, further comprising a front frame installed between the liquid crystal display panel and the first light guide plate.

11. The liquid crystal display apparatus according to claim 1, comprising:
    a PCB operating the liquid crystal display panel; and
    a FPC connecting the liquid crystal display panel and the PCB, and folded at an edge of the back light assembly to install the PGB on one side of the circumference of the back light assembly.

12. The liquid crystal display apparatus according to claim 1, further comprising a rear frame combined with a rear side of the mold frame in which the second light guide plate is received.

13. The liquid crystal display apparatus according to claim 1, further comprising:
    a front frame combined with upper edges of the first light guide plate,
    wherein the front frame includes a supporting groove provided on an upper surface of the front frame, the support groove receiving the liquid crystal display panel.

14. A back light assembly comprising:
    a first light guide plate;
    a second light guide plate spaced from the first light guide plate;
    a first lamp assembly disposed adjacent to the first light guide plate and to emit light toward the first light guide plate;
    a second lamp assembly disposed adjacent to the second light guide plate and to emit the light toward the second light guide plate;
    a spacing part disposed between the first lamp assembly and the second assembly to prevent from electrical interference between the first and second lamp assemblies
    wherein the spacing part includes an upper surface making contact with the first lamp assembly and a lower surface making contact with the second lamp assembly.

15. The backlight assembly according to claim 14, wherein the spacing part is further disposed between an end portion of the first light guide plate and an end portion of the second light guide plate.

16. The backlight assembly according to claim 14, wherein each of the first and second lamp assemblies comprises:
    a lamp disposed in a circumference of the first or second light guide plate; and
    a lamp reflector to surround the lamp and prevent the light of the lamp from radiating to a direction opposite to the first or second light guide plate.

17. The backlight assembly according to claim 14, further comprising an optical diffuser disposed on a surface of the first or second light guide plate.

18. The backlight assembly according to claim 17, wherein the optical diffuser has a convex-concave pattern.

* * * * *